N. E. LUBOSHEY.
MULTIPLE IMAGE PHOTOGRAPHY.
APPLICATION FILED DEC. 22, 1916.

1,351,430.

Patented Aug. 31, 1920.
2 SHEETS—SHEET 1.

Witness:

Inventor
Nahum E. Luboshey
by his Attorney

N. E. LUBOSHEY.
MULTIPLE IMAGE PHOTOGRAPHY.
APPLICATION FILED DEC. 22, 1916.

1,351,430.

Patented Aug. 31, 1920.
2 SHEETS—SHEET 2.

UNITED STATES PATENT OFFICE.

NAHUM E. LUBOSHEY, OF HARROW, ENGLAND.

MULTIPLE-IMAGE PHOTOGRAPHY.

1,351,430.     Specification of Letters Patent.      Patented Aug. 31, 1920.

Application filed December 22, 1916. Serial No. 138,462.

*To all whom it may concern:*

Be it known that I, NAHUM E. LUBOSHEY, a citizen of the United States, and a resident of Harrow, England, have invented certain new and useful Improvements in Multiple-Image Photography, of which the following is a specification.

This invention is an improvement in cameras of that type in which a plurality of separate monochrome images may be secured in a single focal plane by a single objective and by a single exposure.

I seek by means of my invention to produce the plurality of images in a single focal plane by mechanism which may be readily applied to or adapted to the ordinary camera without alteration of the objective or the fundamental features of construction of the camera.

In order to secure this main object, I so position one or more refracting prisms non-concentrically and preferably symmetrically in respect to the objective of any ordinary type of camera on the market, that it or they will be in the path of all of, or a portion of, the light rays passing through the objective, and so that the image formed by said rays passing through the prism will be formed in the same focal plane as though no prism were used, but will be laterally displaced in said plane from the position it would otherwise occupy.

By employing two or more light receiving or light emitting prism surfaces at an angle to each other, a corresponding number of images will be formed, each displaced in a direction and to an extent depending, among other things, upon the angle of said prism surface to the axis of the objective. The prism or prisms may be so positioned that some of the light rays may pass through the objective and to the focal plane without passing through any prism and thereby the usual image, without lateral displacement, may also be formed.

In practice, it is ordinarily desirable to use a prism or prisms of such character that the resulting displacement will space apart the several images or at least prevent them from overlapping to any considerable extent.

As one important feature of my invention, I provide means for varying the relative brilliancy or intensity of the several images at will. This may be done without cutting down the total amount of light reaching the focal plane by moving the prism or prisms laterally to cover more or less of the objective.

The variation in the relative brilliancy or intensity of the several images may also be secured by means of an opaque shutter or diaphragm having an opening registering with the objective opening. By moving this diaphragm or shutter in its own plane, the amount of light along any edge portion of the objective may be cut off to thereby reduce or cut off the light from one or more of the prism or prism faces and correspondingly vary the relative and actual brilliancy of the image or images formed by the light rays passing through said prism faces.

As has been previously pointed out, I can, by means of my invention, secure a plurality of separate monochrome images by a single objective and by a single exposure. These images will all be of exactly the same size, shape, and relative proportions, but may vary in intensity or brilliancy. I do not wish to be limited in the use or utilization of these images, although one of the most important uses which I now have in mind would be in connection with color photography. By interposing color screens in the path of the light rays forming the several images, the separate images may be formed by red, green and blue rays and the resulting monochrome images resulting from the development of the sensitized medium in the focal plane may be used in any well known manner for producing a color transparency, separate printing plates for use with correspondingly colored inks, or for use with corresponding screens in projection apparatus. The three monochrome negatives may be used in any one of a large number of different ways familiar to those skilled in the art of color photography.

The facility with which the amount of light going to the several images may be varied is particularly important in connection with color photography. With a two-face prism positioned to leave a part of the objective uncovered, the relative areas of the three light transmitting sections of the objective may be varied in accordance with the relative actinic values of the different colored light rays or the relative densities of the color screens.

In the accompanying drawings, I have illustrated rather diagrammatically certain of the forms which my invention may assume, but I wish it particularly understood that I am not limited to the details of construction illustrated or the particular relative proportions, sizes or other features, except as defined in the appended claims. In these drawings, Figure 1 is a diagrammatic view of a camera embodying my invention and showing the prisms between the objective and the focal plane, the section through the cap being on the line 1—1 of Fig. 4;

Figure 1:
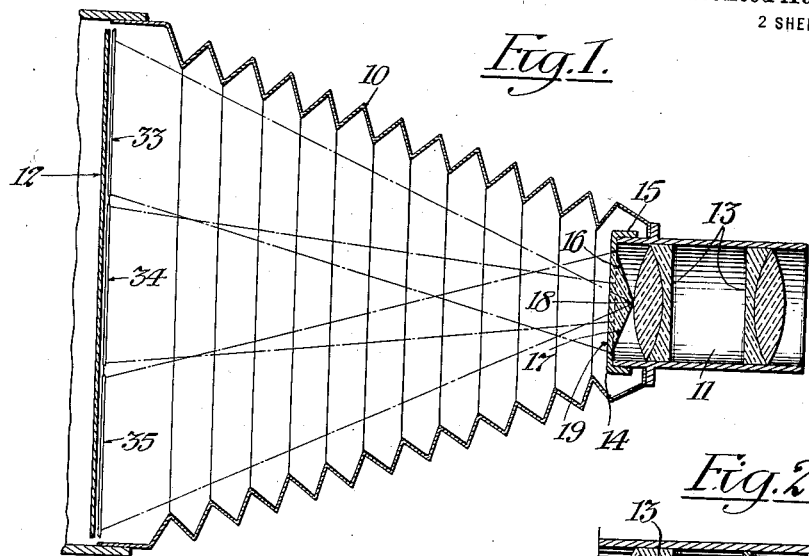

I wish it particularly understood that my invention is not limited to any specific form or type of camera, sensitized medium, or objective, and that it may be employed as a part of, or in connection with, most of the ordinary types of cameras now on the market. For that reason, I have not illustrated any camera in detail. In Fig. 1, I have shown merely a dark box 10 having a light receiving opening 11 in one side and a ground glass plate or sensitized medium 12, adjacent to the opposite side and in the focal plane. This may be in the form of a plate, cut film, or kinetograph film or series of such plates or films, depending on the type of camera, etc. In the light opening is the objective 13 which may be of any suitable character, either a single lens or a combination of either ordinary or achromatic lenses.

I do not wish to be limited in any way to the character of the objective or to the means for securing the necessary relative adjustment of the objective and sensitized medium toward and from each other to get the image properly in focus. It is only essential that the image to be formed shall be of materially less width than the width of the sensitized medium, as for instance one-third the width where three images are to be formed in the same plane and side by side on the same sensitized medium. This width of the image in respect to the width of the sensitized medium or mediums may be controlled in various different ways, as for instance by partitions in the camera box, wings or baffles at the light opening, or by selecting an objective of the desired angularity.

Figure 4:
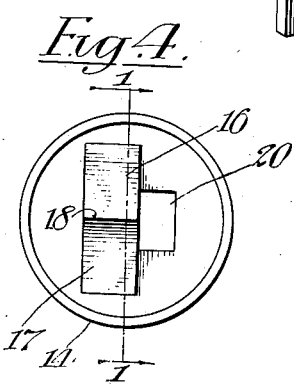
Fig. 4 is a face view of the prism-bearing cap shown in Fig. 1.
Figure 5:
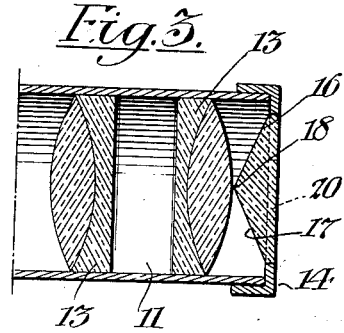
Fig. 5 is a perspective view of the prism employed in the cap shown in Fig. 4.

In the specific form illustrated in Figs. 1, 4 and 5, I provide an attachment to this ordinary type of camera, said attachment including merely a cap 14 and adapted to be secured in position in the axis of the objective close to the objective and either in front or at the rear of the latter, and having an opening therethrough in which is mounted a prism 15. The prism is shown in detail in Fig. 5 and includes two surfaces 16 and 17 intersecting at an angle 18 and opposite to a base or side 19. This base or side 19 may be substantially flat and should make equal angles with the two surfaces 16 and 17 and should be placed in the camera parallel to the sensitized medium or focal plane and at right angles to the axis of the objective.

The prism may be placed in position with the surfaces 16 and 17 facing away from the sensitized medium, in which case they serve as the light receiving surfaces of the prism or they may be placed toward the sensitized medium so as to constitute the light emitting surfaces.

When it is desired to secure three images, a prism, for instance of the character shown in Fig. 5, is employed but it is so positioned that it does not cover the entire objective and light may pass from the objective to the sensitized medium without passing through the prism. It is of course well known that if light pass through any portion of the objective to the sensitized medium, a single image, if in focus, will be formed irrespective of whether such light pass through the entire objective or through only one edge thereof or through any number of separate openings of a diaphragm or shutter, and even though there be several separate portions of the objective which are not covered by the shutter or other light obstructing means. This single image which is formed will be centrally positioned and in line with the axis of the objective. For this reason, the prism may be symmetrically placed over one-half or any other desired fraction of the objective, leaving the other fraction uncovered, and the light which passes through this uncovered fraction will produce on the ground glass, or sensitized medium, a centrally positioned image which will be clear and distinct if the sensitized medium is in the focal plane. The brilliancy or intensity of such image will of course vary with corresponding variations in the relative size of the portion of the objective which is thus uncovered and through which the light may pass unaffected by the prism.

Likewise all of the light which passes through the face 16 of the prism will form a perfect and complete image on the ground glass or sensitized medium, but this image will be displaced laterally in the focal plane to a distance dependent upon the angularity of the prism and in a direction dependent upon the axis about which the converging prism faces are inclined in respect to the focal plane. The light passing through the other prism surface, namely 17, will also form a perfect image in the focal plane and this will be displaced in the opposite direction from the center of the focal plane from the image formed by the light passing through the surface 16. Thus, if the line of intersection 18 of the prism faces 16 and 17 extends vertically, the three images will be formed side by side at the same elevation and with their centers in the same horizontal line in the focal plane, irrespective of how large a portion of the objective is covered by the prism and unaffected by any lateral shifting of the prism in its own plane to vary the areas of the portions of the surfaces 16 and 17 which cover the objective. So long as the surfaces 16 and 17 and the focal plane are vertical, the images produced by the light passing through their surfaces will not be deflected upwardly or downwardly and even though the prism extends across the center of the objective, the image, which is formed by light passing through the uncovered part of the objective, will be at the center of the focal plane.

If the prism be of the form shown in Fig. 5, it may be mounted in an irregular aperture as shown in Fig. 4 so that there will be an opening 20 through which light may pass directly to the focal plane without passing through the prism surfaces 16 and 17.

Figure 6:
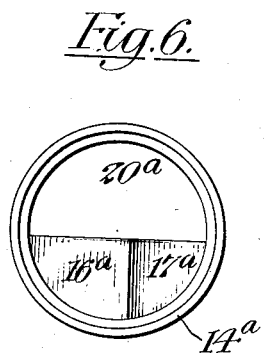
Fig. 6 is a view similar to Fig. 4 but showing a slightly modified form of cap.

In order to secure the maximum utilization of the available light, the prism is preferably so formed and mounted in an opening of such size and shape that all of the light passing through the objective may reach the focal plane. In Fig. 6, I have shown a cap 14ª having a circular opening and have shown a prism, a portion of the outer edge of which is curved to correspond with and fit in the circular aperture of the cap. This prism thus leaves a sector-shaped opening 20ª and two prism surfaces 16ª and 17ª each having two straight lines and one curved edge.

For some purposes, it may be desired to form only two images in the focal plane and to have these displaced equally in opposite directions from the center. If such be desired, a prism of the character shown in Fig. 7 may be employed in which the prism fills the entire opening and entirely covers the objective, and the line of intersection of the faces 16ᵇ and 17ᵇ is a diameter or a complete chord of the objective.

If it is desired that all three images receive the same amount of light and therefore be of the same brilliancy or intensity, then the two light receiving or light emitting surfaces should be of equal area and should each permit the passage of substantially the same amount of light as does the uncovered portion of the objective. By varying the position of the prism in one direction, the relative brilliancy or intensity of the images formed by the surfaces 16 and 17 may be varied but without varying their position in the focal plane or the sharpness or distinctness of the image. If it is desired to vary the brilliancy or intensity of the images formed by the light passing through the surfaces 16 and 17 in respect to the brilliancy or intensity of the image formed by the light passing through the uncovered portion of the objective, the prism may be moved in its own plane in the other direction to increase or decrease the amount of such uncovered objective area.

Figure 8:
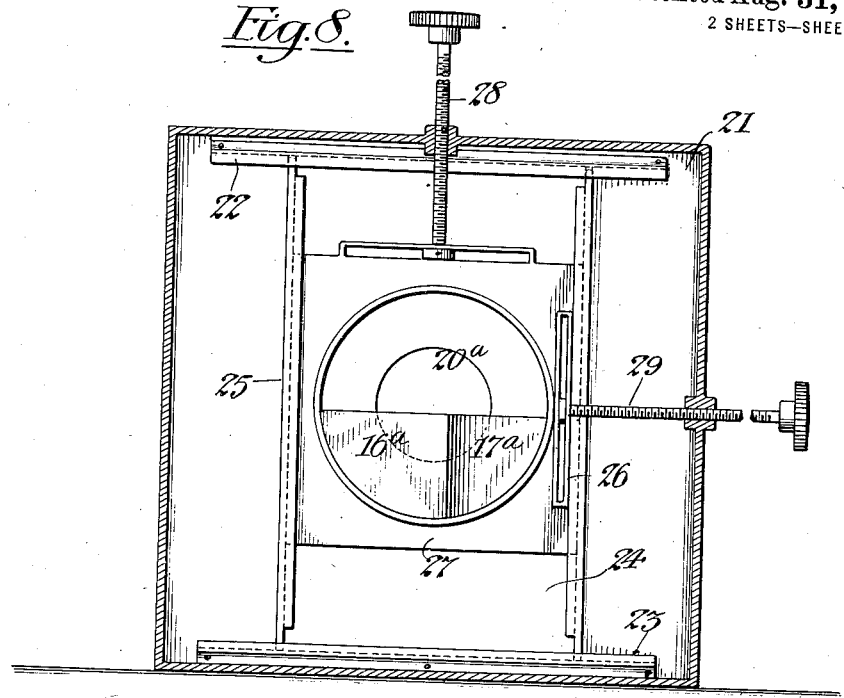
Fig. 8 is a section through the body of a camera in the rear of the objective, looking toward the front, and showing one means which may be employed for adjusting the prism in its own plane.

By providing any known or other form of mechanism for adjusting the prism or the prism holder in its own plane, the relative amount of light going to form the three images may be varied at will and any one of the three images varied from the maximum light afforded by the entire objective down to no light. In Fig. 8, I have shown somewhat diagrammatically a mechanism which might be used for this purpose. The view shows the inside of the camera box looking from the focal plane toward the objective. On the end wall 21 of the camera box are two guides 22 and 23 within which is mounted a slidable plate 24. This plate has two guides 25 and 26 extending in a direction at right angles to the direction of the guides 22 and 23 and serving to support a prism holder 27. The latter has a circular aperture very much larger than the objective and within which aperture is mounted a prism which may be of the form shown in Fig. 6 with prism faces 16ª and 17ª and an open space 20ª. The prism holder 27 may be moved in the guides 25 and 26 and in one direction by a suitable screw 28 or other operating mechanism, and the prism holder, together with the plate 24, may be moved in a direction at right angles by a screw 29 or other suitable operating mechanism. By this means, either prism face 16ª, or 17ª, or the open space 20ª, may be brought into position in front of the entire objective, or the area of the objective may be divided in any desirable proportion between these three light transmitting spaces.

The means above described permits of a variation in the relative brilliancy or intensity of the images without cutting down the total amount of light reaching the focal plane. In such cases, where the cutting down of the total amount of light is not objectionable, the relative brilliancy of any one of the images may be secured in a construction where the prism is stationary, by moving a shutter or diaphragm so as to cover or partly cover the prism faces 16 and 17 or the uncovered space.

Figure 9:
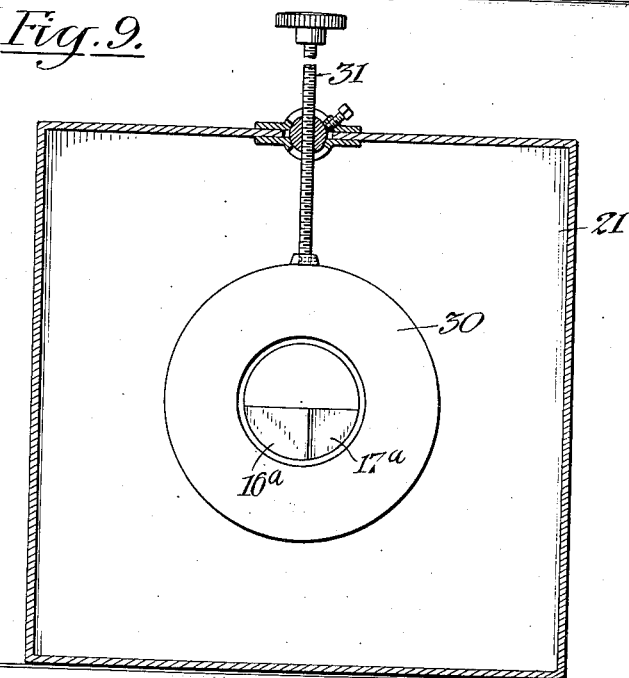
Fig. 9 is a view similar to Fig. 8 but showing means for adjusting a diaphragm or shutter to vary the relative and actual intensity of the images.

I do not wish to be limited to any specific type of such shutter but in Fig. 9 I have shown one which might be employed for the purpose. In this figure, there is shown a large circular diaphragm 30 having a central opening of the full size of the objective or of the light cone of the latter. Any suitable means may be employed for shifting this shutter in any direction in its own plane so as to cut off the light along any side of the objective or light cone. I do not wish to be limited to any particular mechanism for securing such adjustment although I have shown an operating handle 31 extending through an opening in the wall of the dark box and having a suitable light-tight ball and socket support so that the rod may be moved endwise or may be tilted to cut off the light along any side of the objective and thereby reduce the actual as well as the relative intensity of the objective.

The facility with which the relative intensity of the several images may be varied, is of particular importance when the camera is used for securing monochrome images for use in color photography. Somewhere in the path of the light rays to the focal plane there may be introduced color screens of the fundamental or primary colors or of other desired tints or tones. These color screens may be located close to the focal plane and thus each directly in front of the corresponding image. In Fig. 1, I have shown diagrammatically three color screens 33, 34 and 35 in the same plane parallel to the focal plane and each covering approximately one-third of the area of the latter. It is well known that the red rays have less actinic value than those at the opposite end of the spectrum and that therefore if red, blue, and green color screens be employed and a single exposure given, the action on the sensitized plate receiving the red rays will be less than the effect on the other sections of the sensitized medium which receive the other light rays. This is compensated for by so positioning the prism that the relative number of light rays going to produce each of the three images will vary inversely as the actinic value of the light rays passing through the color screens of the several images. Variations in the density of the screen may also be compensated for by the corresponding variation in the position of the prism.

If the sensitized medium, the source of illumination, and the color screens be constant or substantially so, the prism may be rigidly secured in place in a cap as shown in Figs. 1, 4, 6 and 7, but if the camera is to be employed in connection with sensitized mediums of various susceptibilities to different actinic rays and to be used in connection with various different color screens and sources of artificial or natural illumination where the composition of the source of light varies, then it is desirable that either the prism itself be so mounted that it may be adjusted to cover more or less of the objective or that a shutter be employed to vary the relative amounts of light passing to the several images.

Although I have illustrated diagrammatically the color screens 33, 34 and 35 closely adjacent to the focal plane, it is of course evident that these color screens may be at any point in the path of the light rays going to these images. A very simple and effective arrangement is to cement the separate color screens closely adjacent to the prism. The color screen material may be applied to the prism surfaces 16 and 17 as a coating or the color screens may be directly cemented to said surfaces. To counteract any possible difference in effect resulting from the passage of some of the light rays through the glass forming the prism and other light rays passing to another image without passing through such glass, it is evident that a piece of glass may be placed in the opening 20 of a thickness substantially equal to the average thickness of the prism and provided with parallel surfaces.

The prism itself may be formed of a single piece of glass or if finer effects are desired, the prism may be made achromatic in any well known manner as, for instance, by making it of a plurality of suitably arranged pieces of glass cemented together.

Figure 2:
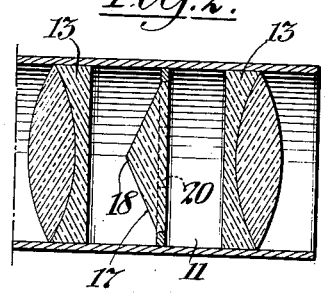
Figs. 2 and 3 are views similar to a portion of Fig. 1 and one of them showing the prism between two sections of the objective and the other showing the prism in front of the objective.
Figure 3:
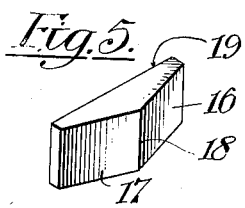

As will be indicated from Figs. 1, 2 and 3, the prism may be mounted between the two separate lenses of the objective, if such objective have a plurality of lenses, or may be in advance of the objective, or upon the side toward the focal plane. Possibly, in some constructions where no adjustment is desired, the necessity of a separate prism holder may be avoided by cementing the prism directly to a face of one of the lenses.

Figure 7:
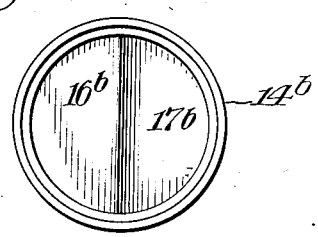
Fig. 7 is a view similar to Figs. 4 and 6, but showing a prism designed to cover the entire objective.

My device is useful for various other purposes than in connection with color photography. For instance, I may use such a prism as is shown in Fig. 7 and have the sensitized medium cover only one-half the back of the camera and a ground glass cover the other half. The photographer may thus see one image on the ground glass and he will thereby know the exact sharpness and degree of illumination of the second image which is directed toward the sensitized medium. While looking through the ground glass he can wait the proper instant for the taking of the picture of a moving or movable object and at the desired instant may operate a focal plane shutter in front of the sensitized medium. By the use of a mirror, the ground glass and its image may be on the top of the camera and serve as the ordinary finder.

Having thus described my invention what I claim is new and desire to secure by Letters Patent is:—

1. A camera having a single objective and a light refracting prism presenting two intersecting faces at equal and opposite angles to the axis of the objective and each partly covering the light aperture of the objective and at the same side of a chord of said aperture, the portion at the opposite side of the chord being uncovered.

2. A camera having a single objective, a sensitized medium in the focal plane and a prism having two intersecting faces, one covering one part of the light transmitting opening of the objective, and the other covering another part of said opening whereby two laterally displaced images are formed in the focal plane and a third part of said opening being unobstructed by said prism whereby a centrally positioned image may also be formed in the same focal plane.

3. A camera having a single objective, a sensitized medium in the focal plane thereof, a prism partly covering the light transmitting opening of said objective and including two faces intersecting at an angle along a chord of said opening whereby one centrally positioned and two laterally displaced images are formed on said sensitized medium.

4. A camera having a single objective, a sensitized medium in the focal plane thereof, a prism partly covering the light transmitting opening of said objective and including two faces intersecting at an angle along a chord of said opening whereby one centrally positioned and two laterally displaced images are formed on said sensitized medium and three color screens interposed in the path of the light rays and between said images and the corresponding light transmitting portions of the objective opening.

5. A camera having a single objective and a light refracting prism presenting a plane base and two faces at equal and opposite angles thereto and intersecting along a chord of the light transmitting opening of said objective, said prism covering only a portion of the total of said light transmitting opening.

Signed at New York, in the county of New York and State of New York, this 11th day of December, A. D. 1916.

NAHUM E. LUBOSHEY.